United States Patent [19]
Foeller et al.

[11] Patent Number: 5,987,957
[45] Date of Patent: Nov. 23, 1999

[54] METHOD OF FORMING A METAL-THERMOPLASTIC-METAL LAMINATE

[75] Inventors: David E. Foeller, Batavia; Kenneth D. Corby, Rochester, both of N.Y.

[73] Assignee: Eastman Kodak Company, Rochester, N.Y.

[21] Appl. No.: 09/030,272

[22] Filed: Feb. 25, 1998

[51] Int. Cl.$^6$ ................................................. B21C 37/02
[52] U.S. Cl. ........................................ 72/379.2; 156/196
[58] Field of Search .................................. 72/46, 47, 361, 72/379.2, 379.4, 420, 397; 29/469.5; 156/196, 245, 285, 297, 308.2, 309.6, 580

[56] References Cited

U.S. PATENT DOCUMENTS

| | | | |
|---|---|---|---|
| 4,116,736 | 9/1978 | Sanson et al. | 156/245 |
| 4,390,489 | 6/1983 | Segal | 72/46 |
| 5,743,979 | 4/1998 | Lorbiecki | 156/285 |

FOREIGN PATENT DOCUMENTS

| | | | |
|---|---|---|---|
| 7070-610 | 5/1982 | Japan | 156/285 |

*Primary Examiner*—Rodney Butler
*Attorney, Agent, or Firm*—William F. Noval

[57] ABSTRACT

A method of forming a metal-thermoplastic polymer-metal laminate into a desired shape comprising the steps of: heating a metal-thermoplastic polymer-metal laminate to a temperature exceeding the melting temperature of the thermoplastic polymer; forming the heated laminate into a desired shape; and cooling the formed laminate. A method of making a cassette comprising the steps of: providing a front panel and a back panel with at least the front panel formed from a shaped metal-thermoplastic polymer-metal laminate; joining the panels so that a cavity exists between them; positioning at least one intensifying screen between the panels, the screen adapted to contact an x-ray film placed in the cassette, such that the shaped laminate panel presses the screen and film in intimate contact; wherein the metal-thermoplastic polymer-metal laminate panel is formed into a desired shape by the steps of: heating a metal-thermoplastic polymer-metal laminate to a temperature exceeding the melting temperature of the thermoplastic polymer; forming the heated laminate into a desired shape; and cooling the formed laminate.

15 Claims, 5 Drawing Sheets

METHOD OF FORMING A METAL-THERMOPLASTIC-METAL LAMINATE

FIELD OF THE INVENTION

This invention relates in general to methods of thermally forming component parts from a laminated sheet comprised of a thermoplastic polymeric core sandwiched between two metallic foil layers and especially to methods which allow the forming of panels of large radius curvature.

BACKGROUND OF THE INVENTION

The reduction in weight of component parts generally made of metals such as steel and aluminum has been an important goal of many industries. Reduction in the weight of automobiles, for example, has significant implications for energy use while reduction in the weight of many tools and consumer devices has potentially favorable ergonomic impacts. A key element in this effort to reduce weight is the need to maintain material stiffness in many applications. While much success has been achieved using filled polymers, and other composite materials, these are often expensive and difficult to form using traditional methods such as cold stamping. Recent developments in the field of metal-thermoplastic-metal laminate structures have been very encouraging. When appropriately processed, these materials can provide not only significant weight reduction, but also allow the needed material stiffness and formability. One such material is an aluminum-polypropylene-aluminum laminate manufactured by Hoogovens Hylite B.V. and named Hylite. This material is 60% lighter than steel and 30% lighter than aluminum while maintaining considerable stiffness, yield strength and tensile strength.

The ultimate usefulness of such lightweight laminates depends on the ability to form the material to useful shapes with reasonably efficient processes and with a precision and accuracy that reflects the needs of the design. It would be desirable to be able to use forming methods typical of those currently in use for metal panels such as die forming etc. Also critical to the use of the material is maintenance of the desired shape after processing. Common methods of forming aluminum and steel parts include stamping, dieing, and forging. A disadvantage of all of these methods is the high force required to overcome the yield strength of the metals. These high forces require very strong dies usually made out of thick and hardened steel. Such common, lower energy forming methods as thermoforming and vacuum forming which are commonly used with plastic materials are generally not considered for forming metals. In addition, when preparing panels and other surfaces where the radius of curvature is relatively large (greater than 3 inches) great difficulties can be found with "spring-back" of the metal such that design modifications to the forming tools are necessary to obtain the desired material shape. In these instances, small variations in material properties can also have profound influence on the dimensions of the final part.

Several methods for forming the metal-thermoplastic-metal laminates have been revealed in the art. While the conventional stamping and die forming methods used for metallic panel materials also work for the metal-thermoplastic-metal laminate, specialized forming processes have been developed to overcome some of the problems encountered with the laminate.

A method of hot-forming described in GB 1092715 consists of placing a thermoplastic sheet between two specially treated aluminum foils and heating the resulting sandwich in a die to coincidentally bond the laminate and form the shape in the same operation. After suitably heating, the die is cooled and the part removed. This method has several disadvantages. Where components for mass production are involved, the heating and cooling of the die creates unacceptably long cycle-times. In addition, the repeated heating and cooling of the forming tool over a broad temperature range (175° C. to 95° C.) for each part formed results in significant wasted energy. Finally, inventories of the specially treated aluminum panels and thermoplastic sheets must be specially managed and in the most desirable case where the aluminum sheets are very thin, great care taken during handling to avoid damage.

Solutions to several of the problems mentioned above are given in EP 547664 which describes preheating a pre-made laminate (e.g. Hylite) to a temperature just below the Vicat softening point of the thermoplastic. The preheated laminate is then formed by placing it in contact with a forming tool such as a matched metal die. While this method overcomes the problems with handling the thin metal foils and managing inventories of the laminate components, it still requires considerable pressure in the forming process and is susceptible to spring-back from the forming tool for large radius shapes. In addition, variations in the thermoplastic core of the laminate or in the mechanical properties of the metallic skins, continue to make the production of the desired shape difficult to accomplish with a high degree of precision.

A third technique, described in EP 598428 employs forming the laminate under ambient conditions followed by heating of the formed piece to relieve the stresses built up in the laminate during the forming process. This process provides the formed laminate with improved resistance to shape change on subsequent exposure to elevated temperature. The post heat treatment is done at near the softening point of the thermoplastic, but well below the melting temperature. While this method allows one to take advantage of existing equipment that might be on a conventional metal processing line, use of the initial ambient temperature forming step shares the same dimensional problems as mentioned above.

The processes of the art do not provide solutions to several key problems encountered in the forming of parts from the metal-thermoplastic-metal laminate. The need to design forming equipment to compensate for both spring-back and lot to lot material variations is the most serious of these. Not only do complex design parameters need to be considered to design the tools, but lot-to-lot variations in such properties as yield strength, make the production of parts which accurately reflect the designers intent very difficult. The processes of the art also continue to require significant mechanical energy in the forming step because of the stiffness of the panel materials, eliminating such efficient and energy efficient process such as thermo- and vacuum-forming from consideration.

SUMMARY OF THE INVENTION

According to the present invention, there is provided a solution to the problems of the prior art.

According to an aspect of this invention, there is provided a method of forming useful component parts from metal-thermoplastic-metal laminates by heating said laminates to a temperature above the melting point of the thermoplastic material prior to contact with the forming tools and then holding said formed laminate in its final shape until it cools below its melting point.

According to another aspect of the present invention, there is provided a method of forming a metal-thermoplastic polymer-metal laminate into a desired shape comprising the steps of: heating a metal-thermoplastic polymer-metal laminate to a temperature exceeding the melting temperature of the thermoplastic polymer; forming the heated laminate into a desired shape; and cooling the formed laminate.

According to still another aspect of the present invention, there is provided a method of making a cassette comprising the steps of: providing a front panel and a back panel with at least the front panel formed from a shaped metal-thermoplastic polymer-metal laminate; joining the panels so that a cavity exists between them; positioning at least one intensifying screen between the panels, the screen adapted to contact an x-ray film placed in the cassette, such that the shaped laminate panel presses the screen and film in intimate contact; wherein the metal-thermoplastic polymer-metal laminate panel is formed into a desired shape by the steps of: heating a metal-thermoplastic polymer-metal laminate to a temperature exceeding the melting temperature of the thermoplastic polymer; forming the heated laminate into a desired shape; and cooling the formed laminate.

ADVANTAGEOUS EFFECT OF THE INVENTION

The present invention provides a method of forming useful component parts from metal-thermoplastic-metal laminates which provides a superior conformance of the laminate to the forming tool, minimizes the "springback" of the part from the tool, eliminates the effects of lot-to-lot material property variation on the shape of the final part and allows the use of less force to form the final parts, thus saving on expensive steel tooling.

DETAILED DESCRIPTION OF THE INVENTION

The method of this invention is characterized in that directly before it comes in contact with the forming tool or device, the metal-thermoplastic-metal laminate is heated and has a temperature which is above the melting point of the thermoplastic layer. In this invention the temperature of the forming tool is held below the melt temperature of the thermoplastic, and because of this, no time and energy consuming heat-cool cycling of the tools is necessary. A surprising result of this method is that despite heating of the thermoplastic layer to beyond the melting point, the adhesion of the thermoplastic layer to the two metal skins is not significantly diminished when the laminate is cooled. Also surprising is the excellent conformance of the laminate to the forming tool, a conformance which is significantly improved over methods of the current art. The formed laminate also retains its shape on further thermal cycling at temperatures between 20° C. and 65° C.

Preferably in the practice of this method, the laminate being formed is held in the tool until the thermoplastic has cooled to below the melting point. While the temperature of the tool is not critical as long as it is below the melting point of the thermoplastic, it has been found that maintaining the tool at a temperature between 20° C. and a temperature which is 10° C. below the melting point of the thermoplastic provides formed parts with the best blend of final shape and shape retention properties as well as a reasonable cycle time for mass production of the parts.

The laminate of this invention can be many metal-thermoplastic-metal constructs, but to maximize the desired weight saving properties, the metal should be a material which is light in weight. Preferred laminates are those in which aluminum comprises the metallic skins.

Likewise, the thermoplastic may be drawn from a wide range of polymeric materials such as polyethylene terephthallate, cellulose acetate, polyethylene, polypropylene, thermoplastic polyurethane, and nylon. The thermoplastic may also contain filler materials such as talc, glass, carbon, and metallic fibers, etc. The preferred laminates are those in which Polypropylene comprises the thermoplastic.

Most preferred laminates for the practice of this invention are those comprised of thin aluminum skins with a polypropylene thermoplastic core. Laminates of this type are fully described in EP 0 598 428 A1 and are marketed under the trade name Hylite by Hoogovens Hylite BV.

The practice of the present invention will now be illustrated by reference to the drawings and with experimental examples.

Figure 1:
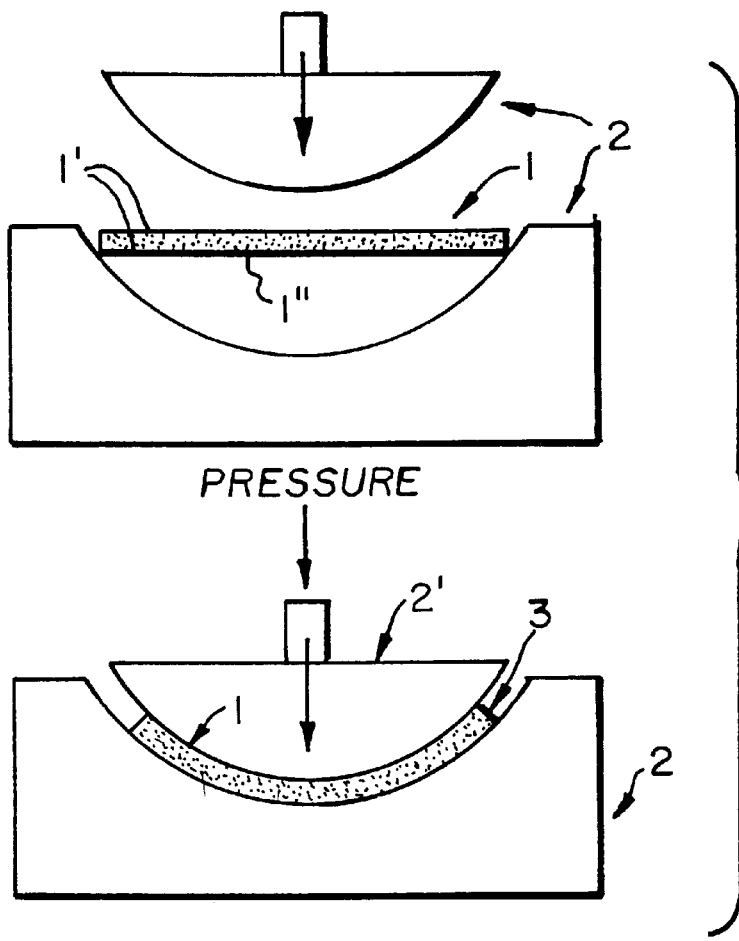
FIG. 1 shows a forming method for forming curved parts by methods of the prior art using matched metal dies.
Figure 2:
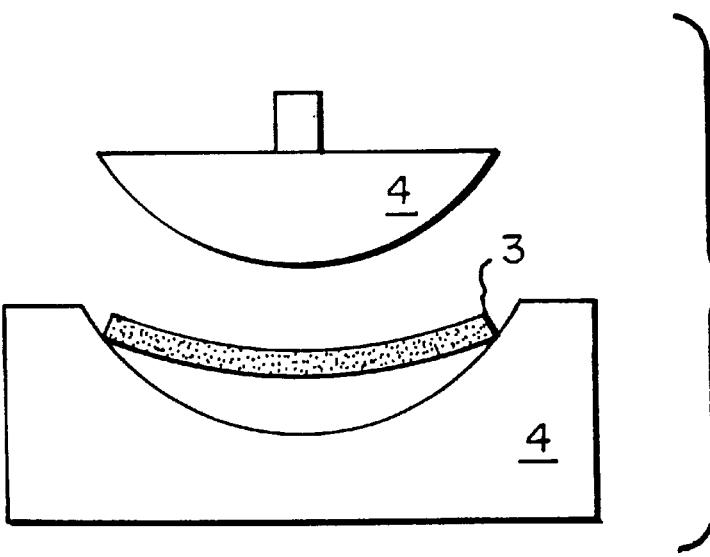
FIG. 2 shows the springback of a curved part from the forming device.

A typical metal forming method well known in the art is the use of so-called matched metal dies. This method is illustrated in FIG. 1 and consists of pressing the metal piece or metal-thermoplastic-metal laminate 1 between two forming dies 2, 2' which are designed to produce the desired component shape 3. Laminate 1 includes metal skins 1' and thermo-plastic core 1". A major difficulty with the methods of the art is the springback of the shaped piece 3 from the opened dies 4 as shown in FIG. 2. This springback results in the need to compensate in the design of the forming tools so that the desired shape is produced, and in the case of panels of large radius, may make forming to the desired shape impossible.

Figure 3:
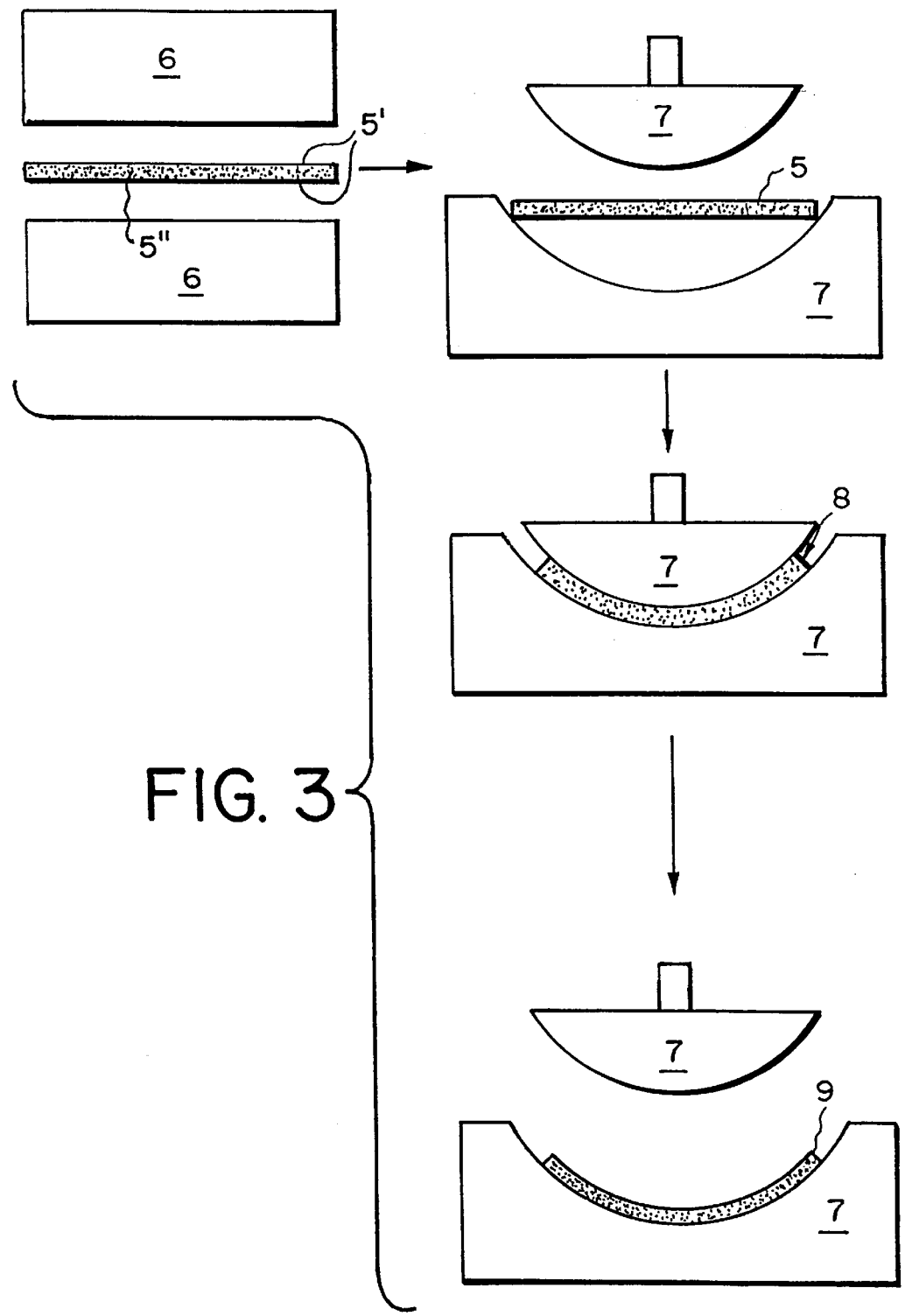
FIG. 3 shows one embodiment of the forming method of the current invention.

FIG. 3 shows an embodiment of a method of the invention. The laminate 5 (metal outer layers 5' and thermoplastic core 5") to be formed is heated in an oven 6 to a temperature above the melting point of the thermoplastic core of the laminate and the transferred to the forming dies 7 for creation of the desired shape. Once the formed laminate, 8, has cooled, the dies are separated. The cooled part, 9, shows excellent conformance to the mold.

The method and advantages of this aspect of the invention are directly illustrated by the following example. The Hylite, aluminum-polypropylene-aluminum laminate was selected for the experiment. The melting point of the thermoplastic polypropylene core material is 165° C.–170° C. The Vicat B softening point referred to in the prior art is 135–155° C. Strips approximately 1" wide and 9" long were selected for testing purposes due to the ease of handling and measurement verification. Matched metal dies were constructed from solid aluminum to a series of forming radii as listed in Table 1. Each test piece was equilibrated at the forming temperature shown in a small oven and then quickly placed between the forming dies and clamped under the pressure needed to close the die completely. In the case of this test, the forming tools were held at a temperature of about 22° C. After a period of about 3 minutes the polypropylene core had solidified and the formed piece was removed from the mold and allowed to cool to ambient temperature. The radius of the test piece was measured and compared to the radius of the die from which it was formed. It is readily apparent from the data in Table 1 that the laminate conformed to the forming tool much more accurately if heated to beyond the melting point of the polypropylene core as is taught by this invention. It should be especially noted that for the larger radii tested, forming by the methods of the art does not result in parts having any conformance to the forming tool.

TABLE 1

| Forming Radius (in) | Finished Radius (in) | | | | | | |
|---|---|---|---|---|---|---|---|
| | 25° C. | 140° C. | 150° C. | 159° C. | 165° C. | 180° C. | 200° C. |
| 4.8 | 10.6 | 10.6 | 10.6 | 8 | 4.5 | 4.75 | 4.75 |
| 10 | ∞ | ∞ | 65 | 30 | 9 | 9.5 | 10 |
| 15 | ∞ | ∞ | ∞ | 50 | 14 | 14 | 14 |
| 20 | ∞ | ∞ | ∞ | 60 | 18 | 18 | 18 |

An additional advantage of the current invention over the art is the ability to overcome variations in laminate material properties. This advantage is illustrated by the following example. The material property of greatest concern during forming is the yield strength of the laminate. The Hylite aluminum-polypropylene-aluminum laminate was again selected for the experiment and three different lots of the laminate were formed as in the experiment described above. Only the 4.8 inch radius of curvature was used in this experiment. The results in Table 2 below show that the methods of the art do not compensate well for the variations in raw materials which can occur from lot to lot due to changes in the yield strength of the laminate. The measured Yield Strength (0.2% offset) for the laminates of each lot is as follows:

| Lot 1: | Longitudinal Direction | 11,223 psi |
|---|---|---|
| | Transverse Direction | 11,265 psi |
| Lot 2: | Longitudinal Direction | 12,017 psi |
| | Transverse Direction | 10,776 psi |
| Lot 3: | Longitudinal Direction | 10,543 psi |
| | Transverse Direction | 10,411 psi |

TABLE 2

| Laminate Lot # | Finished Radius (in) | | | | | | |
|---|---|---|---|---|---|---|---|
| | 25° C. | 140° C. | 150° C. | 159° C. | 165° C. | 180° C. | 200° C. |
| 1 | 12.20 | 12.02 | 11.89 | 10.92 | 4.85 | 4.77 | 4.80 |
| 2 | 11.78 | 12.04 | 11.74 | 10.98 | 4.86 | 4.77 | 4.79 |
| 3 | 10.92 | 11.03 | 10.75 | 10.38 | 4.76 | 4.76 | 4.75 |

It is clear from these data that the method of this invention removes the differences caused by laminate raw material properties.

Yet another advantage of this invention is the significant reduction in the force needed to reach the desired shape when the method of the invention is employed. The following example illustrates this advantage. The Hylite, aluminum-polypropylene-aluminum laminate was again selected for the experiment. The forming Die and test sample were placed in a pre-heated oven and allowed to stabilize at oven temperature prior to testing. A 4.8" radius die set was used for this test and one test sample per each of the three raw material lots shown above was tested at the designated temperatures. The test was performed by opening the oven and immediately closing up the die set onto the test sample, by applying increments of weight until full contact between die surfaces and test sample was achieved. For a specific load the dies had to completely close-up within a ten second period, to eliminate creep forming of the samples. The loading of the test samples was performed in a manner which simulated static-type loading. The data are shown in Table 3 below and clearly indicate the very significant reduction in mold closing force afforded by the practice of the current invention.

TABLE 3

| FORMING TEMP. | MINIMUM REQUIRED FORMING LOAD (lbs) | | |
|---|---|---|---|
| | Lot #1 | Lot #2 | Lot #3 |
| 22° C. | 51 | 54 | 53 |
| 140° C. | 41 | 40 | 39 |
| 150° C. | 33 | 33 | 31 |
| 159° C. | 17 | 18 | 17 |
| 165° C. | 0.2 | 0.2 | 0.2 |
| 180° C. | 0.1 | 0.1 | 0.1 |
| 200° C. | 0.1 | 0.1 | 0.1 |

Figure 4:
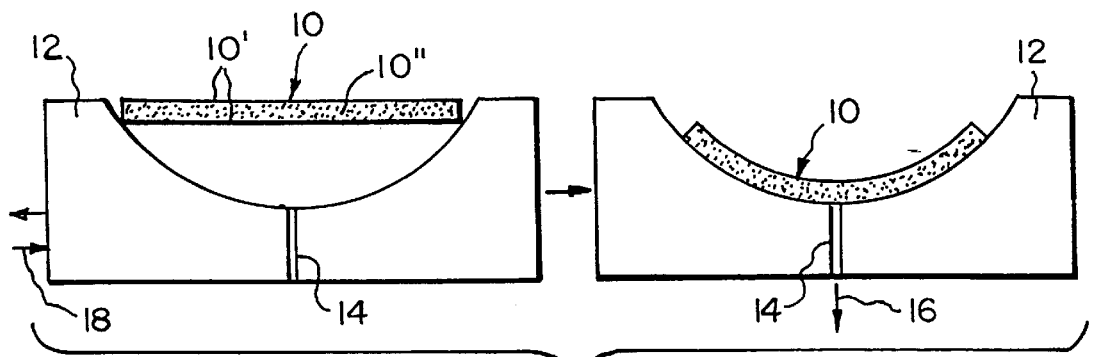
FIGS. 4–10 are views showing other embodiments of the present invention.

Another forming technique for forming the heated metal-polymer-metal laminate is shown in FIG. 4. The heated laminate 10 (outer metal layers 10', core thermoplastic 10") is placed in vacuum die 12 having vacuum port 14. Vacuum is applied to port 14 (arrow 16) to draw laminate 10 into die 12. The formed laminate is cooled and removed from die 12. Cooling or heating lines 18 allow cooling and heating die 12.

Figure 5:
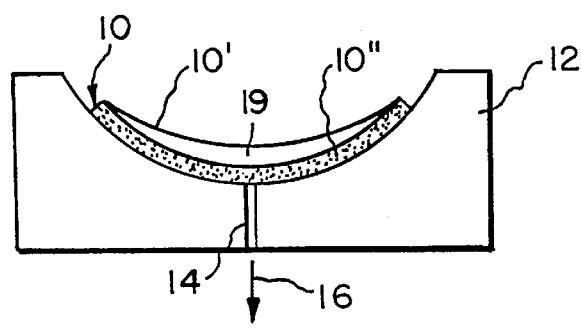
Figure 6:
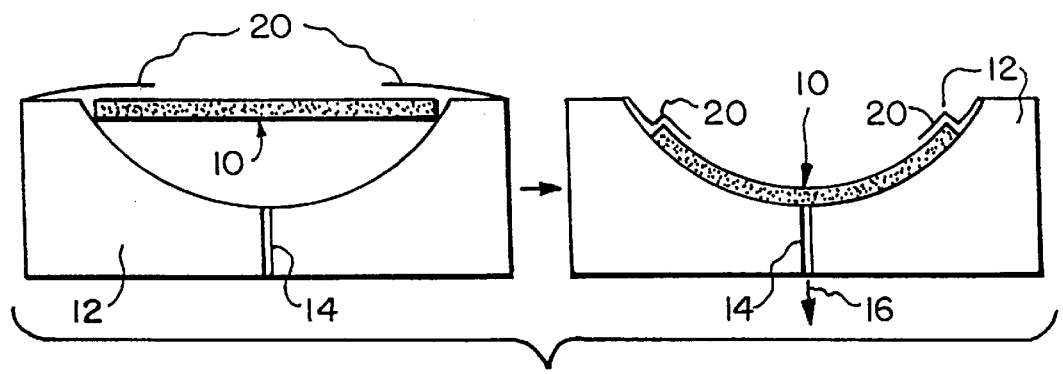

As shown in FIG. 5, the top metal layer 10' of the laminate 10 may separate (as at 19) from the polymer layer 10" after being drawn into die 12 because air gets into the laminate. This separation can be prevented by providing sealing flaps 20 (of cloth, plastic, etc.) around the perimeter of laminate 10 to keep laminate 10 from separating when it is being formed (FIG. 6).

Figure 7:
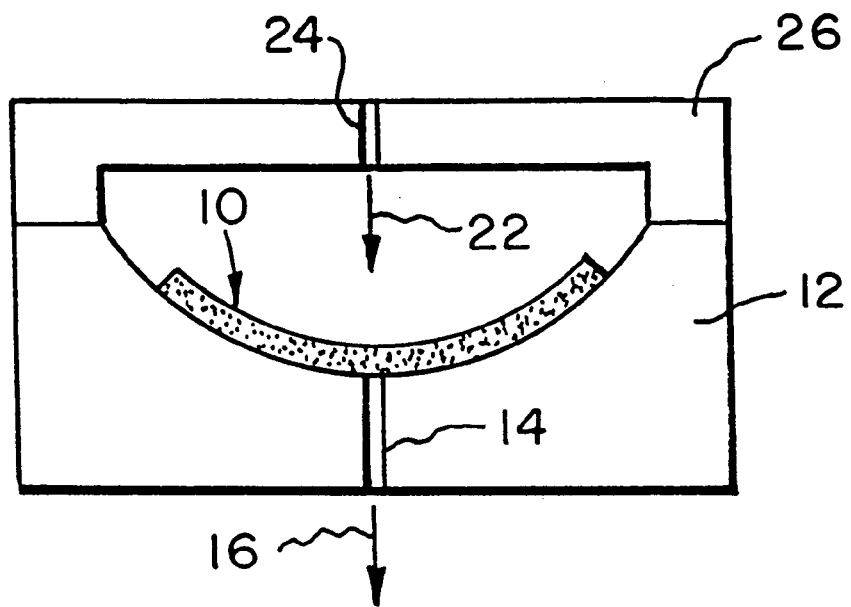

Another technique for preventing separation of the top metal layer 10' from core 10" is shown in FIG. 7. Compressed air (gas) (arrow 22) is directed against laminate 10 through port 24 in upper die 26 as vacuum (arrow 16) is applied to die 12.

Figure 8:
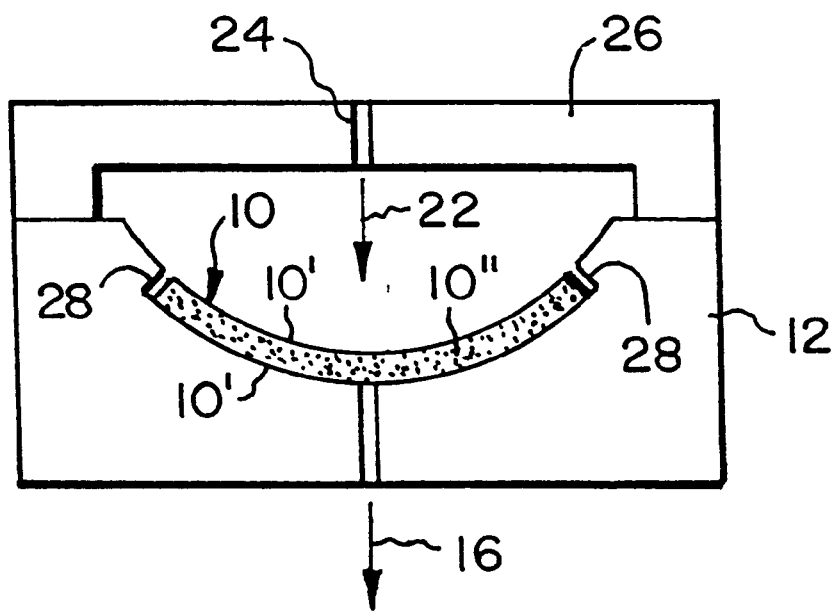

FIG. 8 shows a die configuration similar to FIG. 7. However, precise sides 28 built into die 12 prevent polymer 10" from flowing out from between metal layers 10' during the forming process.

Figure 9:
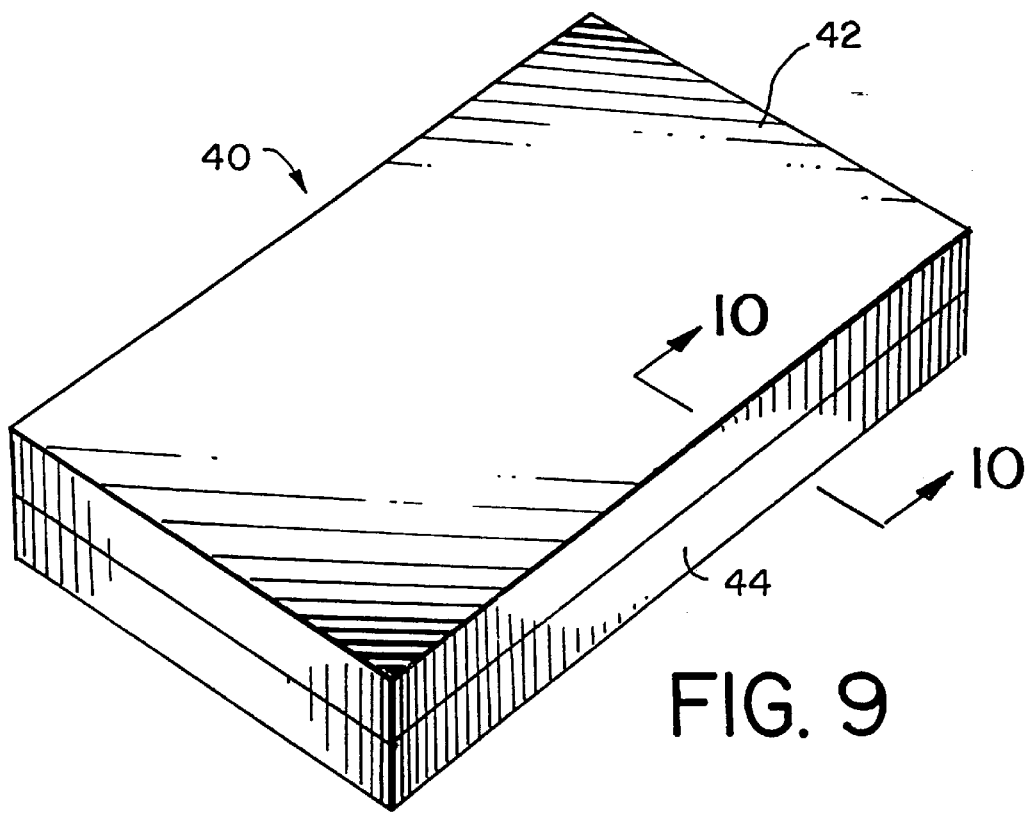
Figure 10:
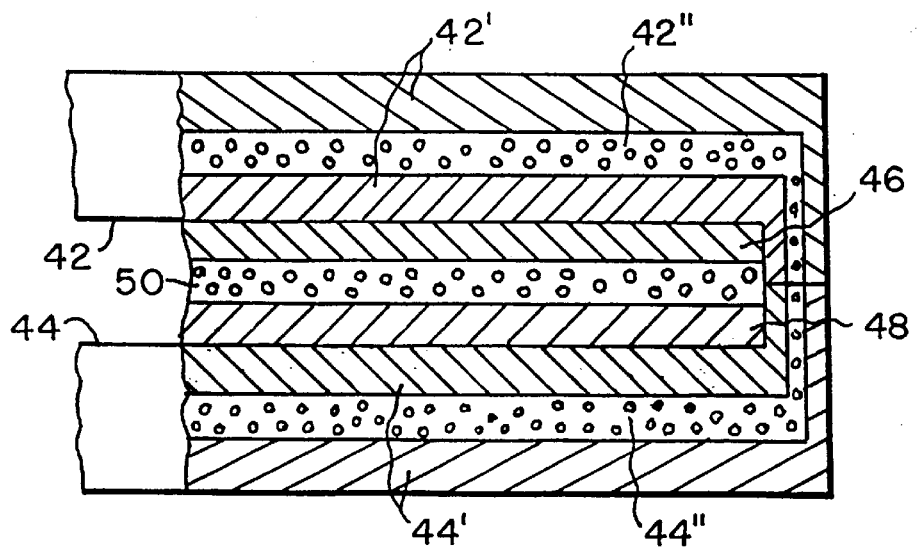

The method of the present invention is useful in shaping the panels of an x-ray film cassette. As shown in FIGS. 9 and 10, x-ray film cassette 40 includes upper and lower panels 42 and 44 forming a cavity for one or two intensifying screens 46,48 held in contact with x-ray film 50. Panels 42,44 are metal-thermoplastic polymer-metal laminates which are formed into a desirable shape to hold screens 46,48 in contact with x-ray film 50. Panel 42 has metal layers 42' and polymer layer 42" and panel 44 has metal layers 44' and polymer layer 44". Panels 42, 44 are formed according to the forming methods described above. The laminate panels are substantially lighter than all aluminum panels while maintaining the strength and rigidity of aluminum.

For a 35 cm by 43 cm (14"×17") x-ray cassette, panels 42, 44 need a shape similar to a 69" radius. There is much more to this shape, but from a distance, it appears to be simply curved. Both panels of the cassette are curved to add pressure to the film and x-ray absorbent screens inside the cassette when the cassette is closed. The closer the film gets to the screens, the better the x-ray image. To cold form this 69" radius, there is a need to bend the 15" wide panel into a 5"–10" radius and then let go. It should then spring back to the 69" radius shape needed. In other words, the panel needs to be bent into a curve until the two ends touch. That requires very special forming tools. With that much spring back, the accuracy of the resultant shape is quite variable and the resultant image quality may be unacceptable.

The hot forming process described above is much easier (much lower forces and less expensive tooling) and does not exhibit any spring back. It also does not experience any loss of shape from the first few cassette closing and opening cycles. The current solid aluminum panels will loose about 10% to 20% of their shape during the first 10 opening and closing cycles. In addition, after the initial loss of shape, the solid aluminum cassette shape will remain relatively stable, but starts a very slow "creep" towards a flatter panel over years of storage in the closed position (closed is a high stress state).

Another advantage of hot forming metal-thermoplastic polymer-metal laminate panels is its very long term stability (it keeps it's shape) compared to the solid aluminum panel (flattens out over time). This can be due to a lower starting stress in the hot formed laminate panel compared to the cold formed solid aluminum panel. This starting stress can be demonstrated by cutting the formed panels and comparing how the pieces change shape when separated from the panel. If you cut the embossed edges off of a hot formed laminate panel, the flat center panel and stepped embossed pieces keep their starting shapes. This indicated each piece is in a relaxed state after hot forming. When the embossed edges are cut off the solid aluminum panel (cold formed), the embossed edges jump to a more curved state while the flat center portion of the panel flattens out. This indicates the shape of the panel is a compromise between the strength of the embossed edges with their high curvature ad the flat center section. Both parts are not at their relaxed state and it can be concluded that there is some level of starting stress. When the cassette is stored in a closed position for many years, the solid aluminum panels flatten out. Testing of the hot formed laminate panels indicates they will maintain a better shape given similar environmental conditions for storage.

The invention has been described in detail with particular reference to certain preferred embodiments thereof, but it will be understood that variations and modifications can be effected within the spirit and scope of the invention.

PARTS LIST

| | |
|---|---|
| 1 | metal-thermoplastic-metal laminate |
| 1' | metal skins |
| 1" | thermo-plastic core |
| 2 | forming dies |
| 3 | component shape |
| 4 | opened dies |
| 5 | laminate |
| 6 | oven |
| 7 | forming dies |
| 8 | formed laminate |
| 9 | cooled part |
| 10 | heated laminate |
| 10' | top metal layer |
| 10" | polymer layer |
| 12 | vaccum die |
| 12' | cooling and heating die |
| 14 | vacuum port |
| 16 | arrow |
| 18 | cooling or heating lines |
| 19 | separate |
| 20 | sealing flaps |
| 40 | x-ray film cassette |
| 42, 44 | upper and lower panels |
| 46, 48 | intensifying screens |
| 50 | x-ray film |

What is claimed is:

1. A method of making a cassette comprising the steps of:

providing a front panel and a back panel with at least the front panel formed from a shaped metal-thermoplastic polymer-metal laminate;

joining the panels so that a cavity exists between them;

positioning at least one intensifying screen between said panels, said screen contact an x-ray film placed in said cassette, such that said shaped laminate panel presses said screen and film in intimate contact;

wherein said metal-thermoplastic polymer-metal laminate panel is formed into a desired shape by the steps of;

heating a metal-thermoplastic polymer-metal laminate to a temperature exceeding the melting temperature of the thermoplastic polymer;

forming the heated laminate into a desired shape; and cooling said formed laminate.

2. The method of claim 1 wherein said laminate has a planar configuration.

3. The method of claim 1 wherein said heating step is carried out by heating said laminate in an oven.

4. The method of claim 1 wherein said forming step including the step of pressing said heated laminate into a first die having a cavity configured to said desired shape.

5. The method of claim 1 wherein the metal of said laminate is aluminum.

6. The method of claim 1 wherein said thermoplastic polymer of said laminate is selected from polyethylene terephthallate, cellulose acetate, polyethylene, polypropylene, thermoplastic polyurethane, and nylon.

7. The method of claim 1 wherein the metal of said laminate is aluminum and the thermoplastic polymer of said laminate is polypropylene.

8. The method of claim 4 wherein a complimentary shaped second die presses said heated laminate into said first die.

9. The method of claim 4 wherein said forming step includes the step of drawing said heated laminate into a vacuum forming die having a cavity configured to said desired shape.

10. The method of claim 4 wherein said forming step includes the application of a compressed gas to press said heated laminate into said cavity of said first die.

11. The method of claim 4 wherein said die is held at a temperature of at least 10° C. below the melting temperature of said thermoplastic polymer.

12. The method of claim 4 including the step of removing said formed laminate from said die after said laminate has cooled to a temperature below said melting point of said thermoplastic polymer.

13. The method of claim 4 wherein in said pressing step said first die has sealing flaps around the perimeter of a laminate to keep said metal from separating from said thermoplastic polymer.

14. The method of claim 4 wherein said cavity of said first die has precise sides to prevent polymer from flowing out from between the metal layers during the forming process.

15. The method of claim 9 wherein said forming step includes the application of compressed gas in combination with the vacuum of said vacuum forming die to draw said heated laminate into said die.

* * * * *